INVENTORS.
Berl D. Levenson,
William R. Welty,
BY.

Robert H. Himes

AGENT.

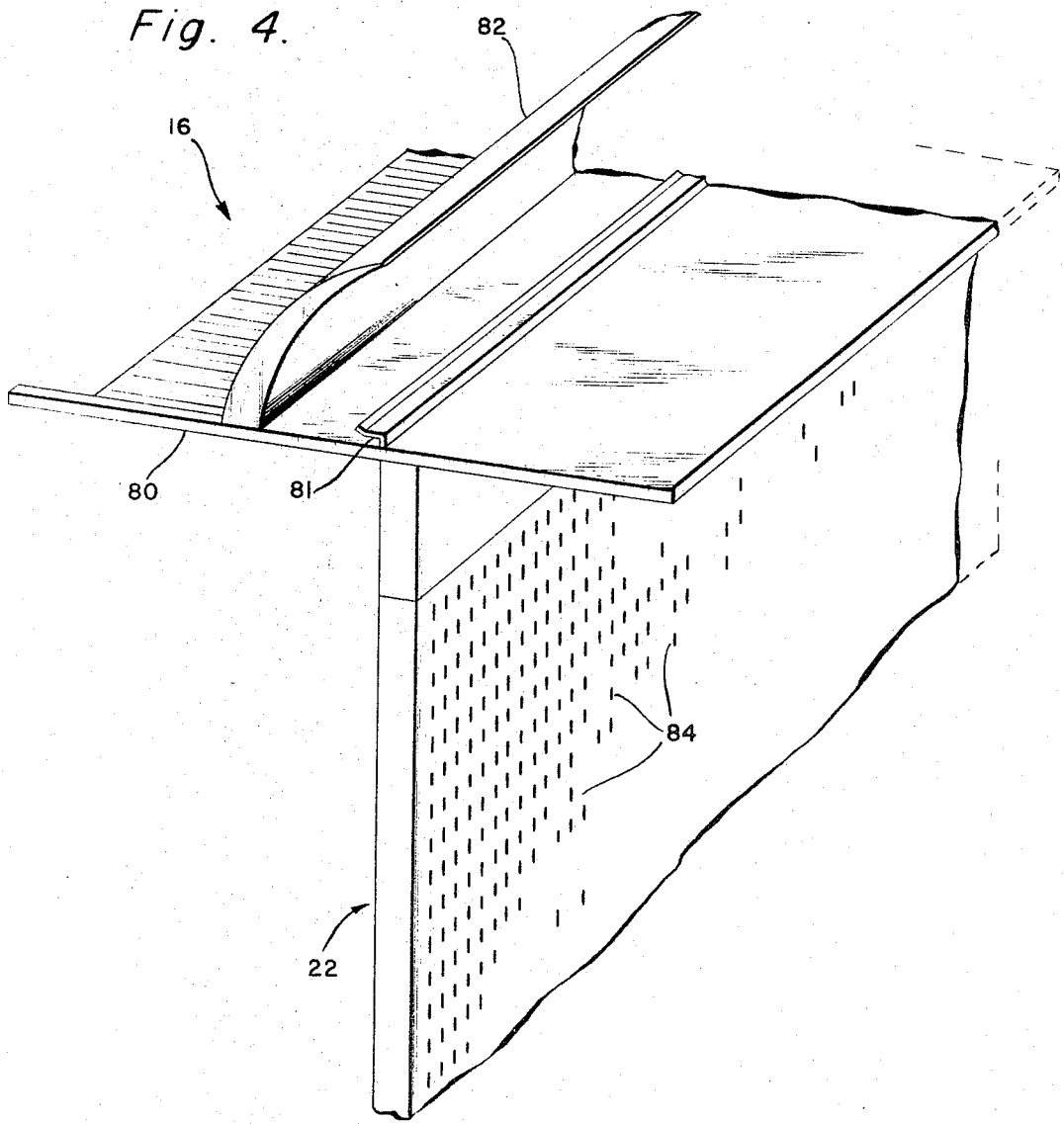

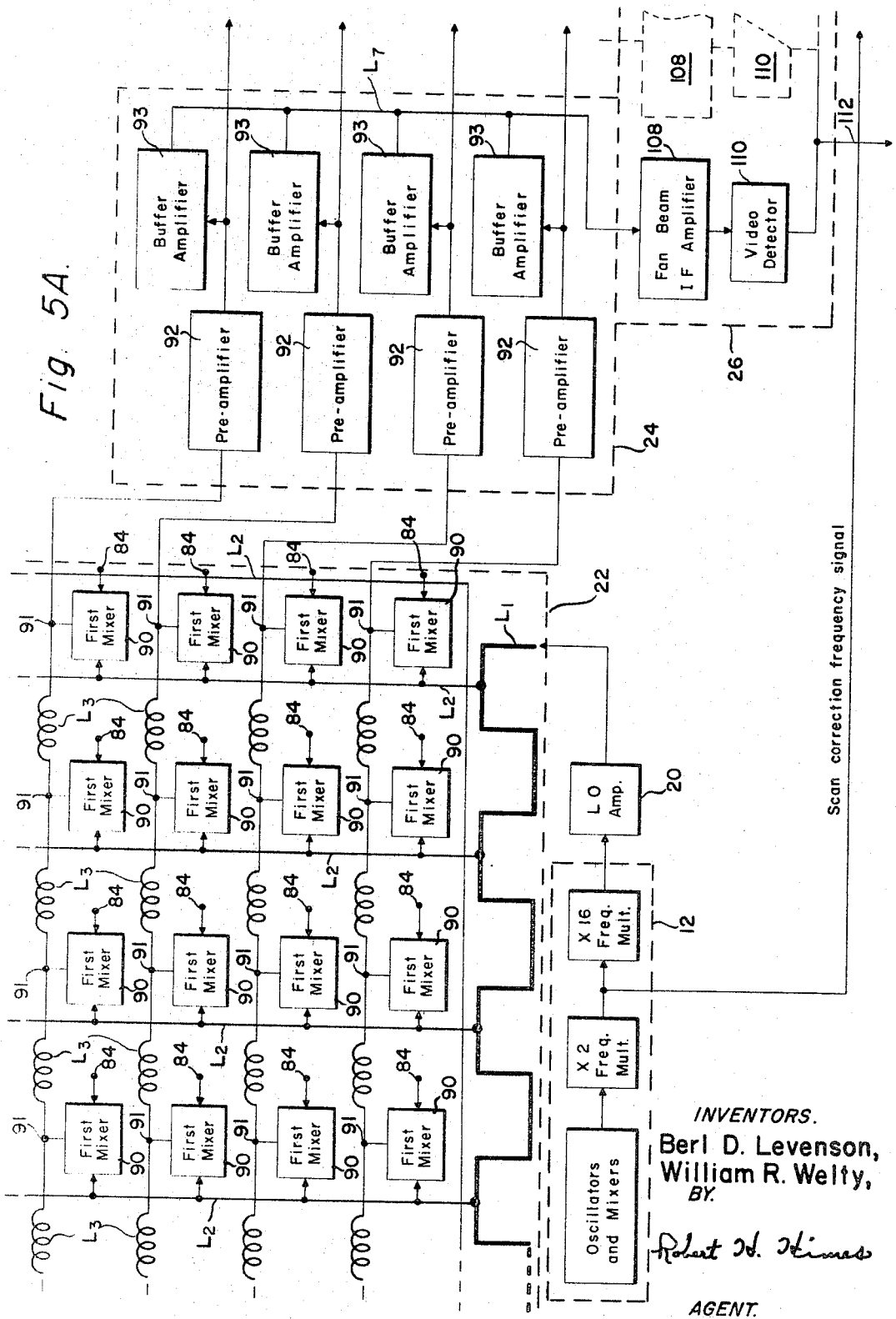

INVENTORS.
Berl D. Levenson,
William R. Welty,

United States Patent Office 3,308,456
Patented Mar. 7, 1967

3,308,456
ELECTRONIC SCANNING RADAR SYSTEM
Berl D. Levenson, Los Angeles, and William R. Welty, Fullerton, Calif., assignors to Hughes Aircraft Company, Culver City, Calif., a corporation of Delaware
Filed Jan. 3, 1958, Ser. No. 707,068
14 Claims. (Cl. 343—5)

This invention relates to electronic scanning radar apparatus and more particularly to radar apparatus capable of electronic azimuth and elevation beam positioning to effect simultaneous tracking of multiple targets with a pencil beam while performing either two or three dimensional search.

The radar apparatus of the present invention incorporates separate transmitting and receiving array systems capable of being electronically scanned through at least one quadrature of azimuth. Thus, in an actual application, four array systems could be oriented so as to scan through 360° of azimuth, if desired. In accordance with the present invention, the transmitting array includes a horizontal linear array of slot radiators which is adapted to direct a fan beam in a selected azimuthal direction dependent upon the transmitter frequency. The receiving array, on the other hand, is an entirely separate array which includes a number of horizontal linear arrays of receiving apertures or elements disposed coextensively with each other in a vertical plane. The receiving fan and pencil beams may be directed in azimuth by controlling the local oscillator frequency and the pencil beams may additionally be directed in elevation by controlling the relative phase of the vertical element signals from the receiving array at the time and place of their addition.

In operation, the local oscillator frequency is such that the fan and pencil receiving beams are directed in the same azimuthal direction as the transmitter fan beam in order to receive reflected energy. Two dimensional search (i.e., azimuth and range) is provided by employing the receiving fan beam in conjunction with the transmitter fan beam. In this mode of operation, enhancement of the video signal is achieved by detecting and adding the signals from two or more groups of adjacent horizontal linear arrays of the receiving array so as to effect a noncoherent addition. This mode of operation may also be adapted to moving-target-indication of the type described in a copending application for patent entitled Two-Pulse M.T.I. Radar System, by Nicholas A. Begovich, Ser. No. 624,155, filed Nov. 23, 1956 and assigned to the same assignee as the present application for patent now Patent No. 3,046,547.

The radar apparatus of the present invention also operates in a three-dimensional search mode, i.e., it can provide azimuth, elevation and range of targets. This type of presentation is accomplished by scanning a pencil receiving beam in elevation simultaneously with its being scanned in azimuth in synchronism with the transmitter fan beam.

Further, the disclosed radar apparatus is also adapted to a search-track mode of operation. In the present system, the receiving antenna array can be made to furnish any number of simultaneous pencil beams in different elevation directions by combining the same antenna information with a different interelement phase gradient for each elevation direction. Thus, in accordance with the present invention, the present radar apparatus is adapted to have two simultaneous elevation pencil beams displaced by the order of one elevation beamwidth. The use of simultaneous beams in this manner increases the accuracy with which a target may be tracked and also reduces the time required to track the target to the extent that the apparatus may be designed to time-share the search-track modes of operation so that both may be accomplished simultaneously.

A particular advantage of the radar apparatus of the present invention is that it employs a separate transmitting array and a separate receiving array and hence requires no duplexer. This is of importance because in any method of electronic beam scanning it is imperative that a precise phase distribution be maintained over the entire antenna aperture. Increasing power by the use of several transmitters is not feasible because at the present time it is not considered possible to obtain sufficiently accurate coherence between several transmitting amplifier chains operating at microwave frequencies. On the other hand, a single transmitter, as in the present case, may be employed with delay lines of precision lengths to maintain such precise phase distributions over the antenna aperture. Because of the present-day limitations on duplexer power handling capacity, however, there would be a limit on the maximum power which could be radiated by an apparatus using only a single antenna. The present radar apparatus has no such limitation on maximum power radiated, however, as it does not, as mentioned above, require the use of a duplexer.

It is, therefore, an object of the present invention to provide an improved electronic scanning radar apparatus incorporating separate transmitting and receiving arrays.

Another object of the invention is to provide an electronic scanning radar apparatus capable of providing a two-dimensional search with video enhancement achieved within a single sweep interval that is equivalent to the video enhancement requiring several sweep intervals when obtained with storage techniques.

Still another object of the invention is to provide an electronic scanning radar apparatus capable of determining range, azimuth and elevation of surrounding targets.

A further object of the present invention is to provide an electronic scanning radar apparatus capable of independently controlling the phase difference between the receiving elements of an antenna thereby to produce a synthesized receiving pencil beam.

A still further object of the invention is to provide an electronic scanning radar apparatus capable of providing two simultaneous elevation pencil receiving beams displaced by the order of one elevation beamwidth thereby to effect monopulse tracking of a target in elevation with increased accuracy and requiring less tracking time than present-day conventional radar systems.

The above-mentioned and other features and objects of this invention and the manner of attaining them will become more apparent by reference to the following description taken in conjunction with the accompanying drawings, wherein:

FIG. 4 illustrates a perspective view of the transmitter and receiving antennas of the radar system of FIG. 1; and FIGS. 5A and 5B constitute a schematic diagram of the receiver section of the system of FIG. 1.

A general description of the disclosed radar system will first be presented to provide an overall concept of the present invention. This general description will be followed by a more detailed description of the design and operation of the system. In order to point out more clearly the invention, simplifications will be made wherever possible and functions not essential to the basic mode of operation such as temperature compensation and space stabilization will be omitted from the description.

Figure 1:
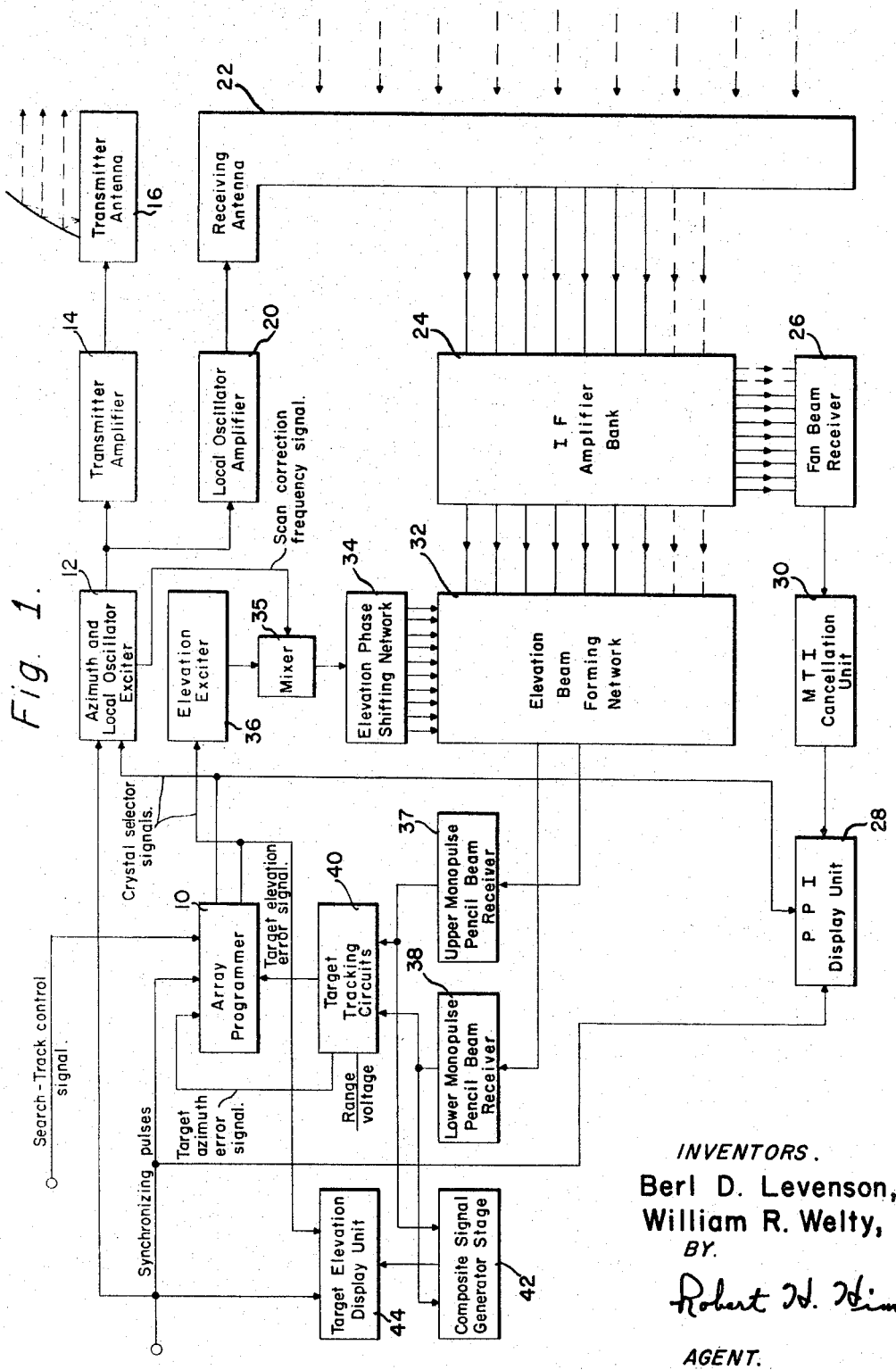
FIG. 1 illustrates a schematic block diagram of the electronic scanning radar system of the present invention.

Referring now to FIG. 1, there is illustrated a block diagram of the electronic scanning radar system of the present invention wherein an array programmer 10 in response to a search-track control signal, target azimuth and elevation error signals and synchronizing pulses applied thereto generates the azimuth and elevation crystal selector signals. As will be hereinafter explained in more detail, the search-track control signal may cause the array programmer 10 to generate crystal selector signals that are such that the radar system operates in a search mode, a tracking mode, or a search-track mode wherein searching and tracking targets are accomplished on a time-sharing basis. An azimuth and local oscillator exciter 12, in response to the azimuth crystal selector signals, generates a signal which successively changes between the transmitter and the local oscillator frequencies and, in addition, a scan correction frequency signal. The transmitter frequency signals thus generated are amplified by a transmitter amplifier 14 and applied to a transmitter antenna 16 which is designed to radiate a fan-beam in an azimuthal direction dependent upon the frequency of the radiant energy. The local oscillator frequency signals, on the other hand, are amplified by a local oscillator amplifier 20 and applied to a receiving antenna 22 which comprises a two-dimensional array of elements arranged in vertical and horizontal rows. In general, the receiving antenna 22 is divided into 15 groups, each of which contains 8 horizontal rows of elements. The coherent addition of the received signals from the eight horizontal rows of elements constituting each group results in a nominal 15 degree elevation beamwidth of the receiving antenna beams. In operation, the frequency of the local oscillator signal is shifted in a manner to cause each of the fifteen receiving antenna beams to track with the transmitting antenna beam. The receiving antenna 22 provides an intermediate-frequency output signal from each one of the fifteen groups constituted of eight horizontal rows of elements. The intermediate-frequency output signals thus developed are amplified by an I.F. amplifier bank 24 and applied to a fan beam receiver 26 which first detects and then combines the signal in a single line to effect a non-coherent addition of the signals. Since the target echo signals are correlated and the noise in the system is not, a resulting gain is obtained. Although this gain is less than that which would be obtained by a coherent addition of the signals, coherent addition of the signals is undesirable in that it would result in a signal that would be received by a beam having a nominal 1 degree elevation beamwidth which beam would remain in a fixed position.

The fan beam receiver 26 thus provides target echo video signals which may be applied directly to a display unit 28 along with synchronizing pulses and azimuth crystal selector signals from the array programmer 10. The display unit 28 derives azimuthal directions from the azimuth crystal selector signals to provide a plan-position presentation of the area scanned by the radar system. Alternatively, a non-coherent moving-target-indication cancellation unit 30 may be interposed between the P.P.I. display unit 28 and the fan beam receiver 26 whereby presentation of moving targets may be enhanced on the P.P.I. display. A typical non-coherent M.T.I. cancellation unit of the type which may be used is disclosed in a copending application for patent, Serial No. 327,558, entitled Moving Target Selector, filed by Harold V. Hance and Norman H. Enenstein on Dec. 23, 1952, now Patent No. 3,026,514 and assigned to the same assignee as the present application.

In order to form the upper and lower pencil receiving beams, the signals received from the horizontal rows of elements of the receiving antenna 22 are amplified by the I.F. amplifier bank 24 and applied to an elevation beam forming network 32 together with output signals from an elevation phase shifting network 34. The phase difference between the output signals from the elevation beam forming network 34 determines the mean angle of elevation of the upper and lower pencil receiving beams. This phase difference is, in turn, determined by the frequency of a composite signal generated by a mixer 35 in response to the scan correction frequency signal provided by the azimuth and local oscillator exciter 12 and the output signal generated by an elevation exciter 36 in response to the elevation crystal selector signals from the array programmer 10.

The elevation beam forming network 32 combines coherently the signals from the horizontal rows of elements of the receiving antenna 22 to result in the upper and lower pencil receiving beams having a beam separation of 1.4°. The resulting signals representative of target echoes received by the upper and lower pencil receiving beams are applied to upper and lower monopulse pencil beam receivers 37, 38, respectively. A target tracking circuit 40, in response to a signal representative of range voltage (source not shown) and the output signals from the upper and lower monopulse pencil beam receivers 37, 38 produce target elevation and azimuth error signals. These error signals are utilized by the array programmer 10 in generating crystal selector signals which correspond to upper and lower monopulse pencil beam receivers are beam positions whereby the target echo return from the of equal amplitude thereby to track a target in elevation and whereby successive target echo returns are also of equal amplitude thereby tracking the target in azimuth.

In addition to the above, the output signals from the upper and lower monopulse pencil beam receivers 37, 38 are applied to a composite signal generator stage 42 to produce a composite video elevation signal. This composite video elevation signal is applied along with synchronizing pulses and the elevation crystal selector signals from which elevation may be derived to a target elevation display unit 44 which provides a visual presentation of the angle of elevation of target echoes and the instantaneous angle of the cross-over point between the upper and lower pencil receiving beams. The range tracking phase of the operation of the present system may be of a conventional type and hence is not described in detail. In the case of the target elevation error signal, the target echo signal received by one of the pencil receiving beams is inverted and compared to the remaining target echo signal to produce a signal representative of the elevation error. The target azimuth elevation signal, on the other hand, is generated in the same manner except that amplitude changes in successive signals from a common source must be the basis on which the error signal is generated.

Figure 2:
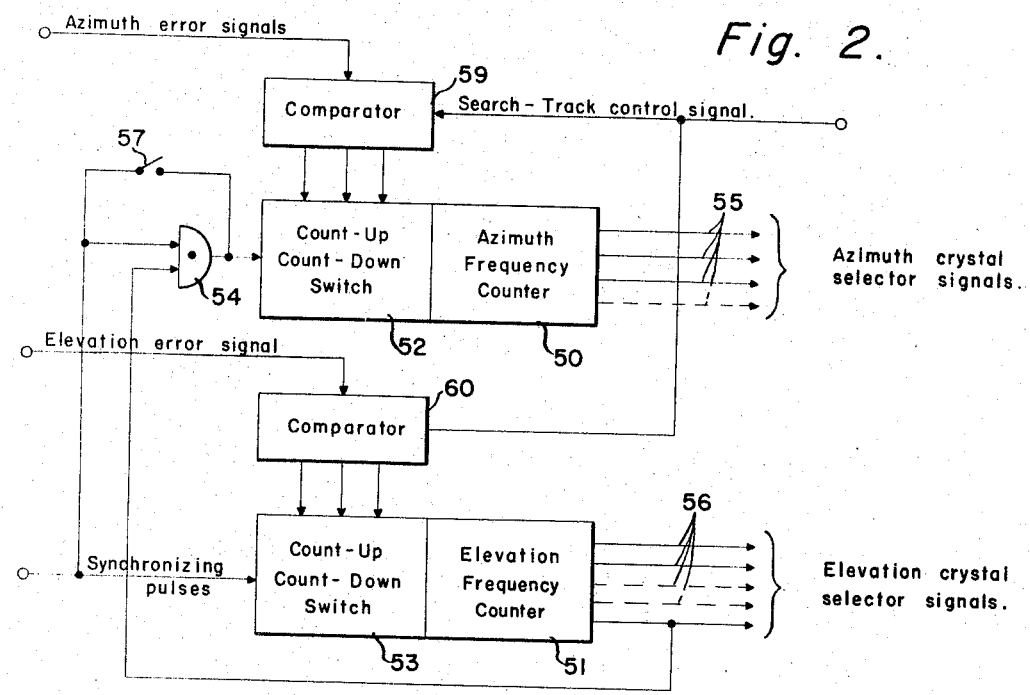
FIG. 2 illustrates a schematic block diagram of the array programmer of the radar system of FIG. 1.

A more detailed schematic block diagram of the array programmer 10 is shown in FIG. 2. Referring to this figure, the array programmer 10 comprises azimuth and elevation counters 50, 51, each of which adapt to count up or down in response to synchronizing pulses applied thereto depending upon the orientation of count-up, count-down switches 52, 53, respectively. Synchronizing pulses are applied directly through switch 53 to counter 51 and through an "and" gate 54 and switch 52 to counter 50. Counters 50, 51 are provided with separate output leads 55, 56, respectively, for each binary number to be stored and are adapted to produce a unidirectional output signal which appears on the respective lead for each binary number thus stored. The signal corresponding to the binary number thus produced on each separate output lead constitutes a crystal selector signal. The crystal selector signals produced by azimuth frequency counter 50 appear on leads 55 and are designated as azimuth crystal selector signals. Similarly, the crystal selector signals produced by elevation frequency counter 51 appear on leads 56 and are designated as elevation crystal selector signals. The particular lead of the leads 56 which corresponds to the highest desired count of counter 51 is also connected to the input of "and" gate 54 whereby counter 50 receives only one synchronizing pulse for each full cycle of operation of counter 51. Thus in a three-dimensional search phase of operation, the azimuthal direction of the transmitter beam is not changed until there has been a complete elevation search of each azimuthal direction. For two-dimensional search, a switch 57 is provided to by-pass "and" gate 54. One example of a counter of the aforementioned type is described in a copending application for patent Serial No. 624,155, filed Nov. 23, 1956 entitled Two-Pulse M.T.I. Radar ystem, by Nicholas A. Begovich, now Patent No. 3,046,547, which application is assigned to the same assignee as is the present case.

The count-up, count-down switches 52, 53 are controlled by comparators 59, 60, respectively. More particularly, the comparators 59, 60 control the orientation of the switches 52, 53, respectively, in such a manner that the counters 50, 51 either don't count or count up or count down in response to synchronizing pulses applied to the inputs thereof. The comparators 59, 60 are each responsive to two control signals, namely, the search-track control signal and the respective target error signal. During the search phase of operation, the comparators 59, 60, in response to the search-track control signal, orient the switches 52, 53 so that the counters 50, 51 always count in one direction through the cycles of operation thereof. During the tracking phase of operation, the comparators 59, 60 in response to the target azimuth and elevation error signals, respectively, orient the switches 52, 53 in a manner such that the counters 50, 51 either don't respond or count up or down depending on the magnitude and polarity of the error signals. In this manner, the array programmer 10 generates crystal selector signals which are employed to select signals of a frequency to effect tracking of the target in both azimuth and elevation by the transmitter and receiver beams.

Figure 3:
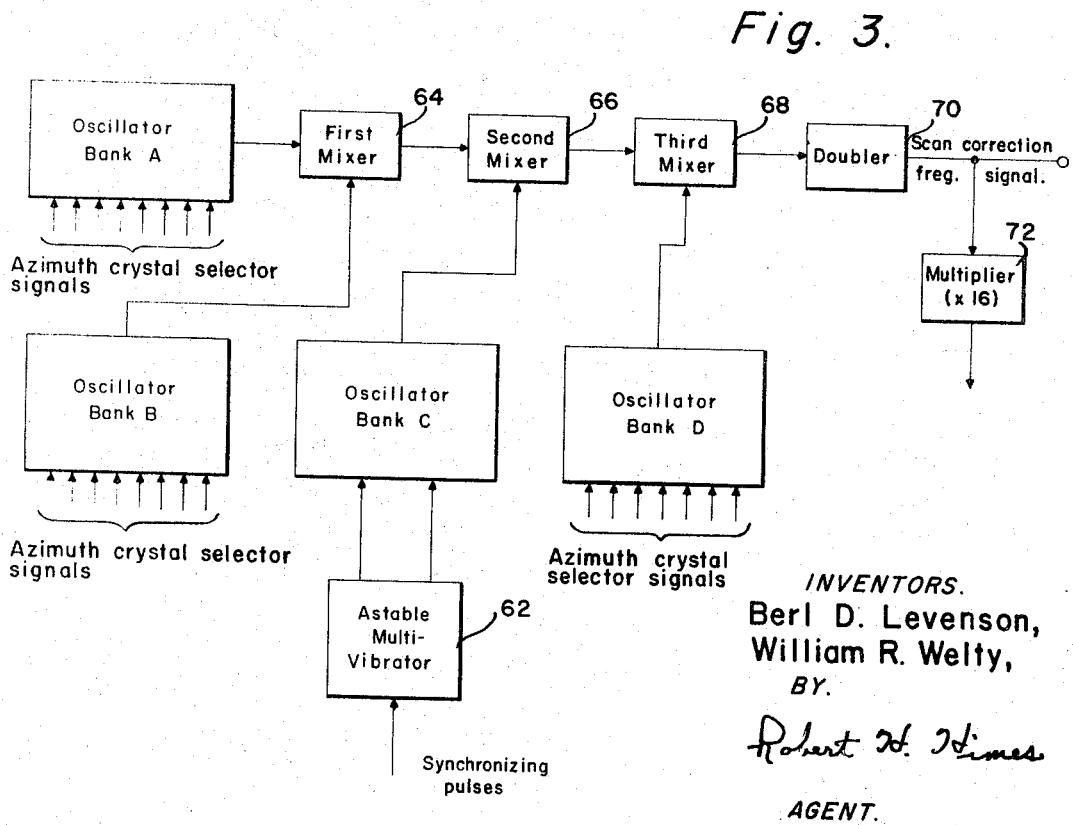
FIG. 3 illustrates a schematic block diagram of the azimuth and local oscillator exciter of the radar system of FIG. 1.

The azimuth and elevation crystal selector signals are fed to the azimuth and local oscillator exciter 12 and the elevation exciter 36, respectively. Referring now to FIG. 3, there is shown an example of the manner in which the exciter 12 may be designed. Because the exciter 12 must necessarily generate a large number of signals having different predetermined frequencies, it is necessary to use of the order of 25 oscillators if crystal controlled oscillators are to be used rather than a voltage tuned oscillator. The latter type of oscillator is generally not suitable for M.T.I. applications.

The azimuth and local oscillator exciter 12 generates signals for both the transmitter and the receiver local oscillator. The exciter 12 comprises four banks of oscillators A, B, C and D, banks A and B having eight oscillators, bank D having seven oscillators, and bank C having two oscillators. Each oscillator of the banks A, B and D is associated with an "or" gate and each crystal selector signal lead is connected to the input of only one "or" gate in each of the banks A, B and D so that only one oscillator from any one bank will be switched into the mixing circuits at any one time. The signals from bank A, B and D are capable of providing a total of 448 different frequencies. Only 360 different frequencies are required to scan the full 90 degrees in azimuth. The additional frequencies may be used in temperature compensation of the system.

Oscillator bank C contains only two oscillators. The purpose of this bank is to switch the output of the exciter 12 from the transmit frequency to the receive frequency. Oscillator bank C is controlled by an astable multivibrator 62 which, in turn, is responsive to synchronizing pulses such that one oscillator in bank C corresponding to the transmitter frequency will be gated on during approximately 15 microseconds following each synchronizing pulse after which time the remaining oscillator corresponding to the local oscillator frequency will be energized.

The frequencies of the signals generated by oscillator banks A, B, C and D are combined by a first mixer 64, a second mixer 66 and a third mixer 68. In the present disclosure of invention, the term "mixer" is assumed to include a suitable filter so as to reject all but the desired frequencies. The first mixer 64 accepts signals from oscillator banks A and B to generate an output signal which is applied to the second mixer 66 along with the signal generated by oscillator bank C. The signal appearing at the output of the second mixer 66 is, in turn, applied to the third mixer 68 along with the output signal generated by the oscillator bank D.

Since the output of the third mixer 68 in the exciter 12 is at a frequency of approximately 100 mc./s., frequency multiplication is required to obtain an S-band output. Five frequency doubler stages are used to obtain the S-band signal. The output of a first doubler 70 is fed not only into an X16 multiplier 72, but is also picked off and applied to mixer 35 to be mixed with the output signal from the elevation exciter 36 in order to provide correction for the frequency sensitivity of the receiving system, as will be hereinafter described. The output of the multiplier 72 feeds the transmitter amplifier 14 which is gated on concurrently with the first oscillator in bank C, and feeds the local oscillator amplifier 20 which is gated on during the receiving period, that is, when the second oscillator in bank C is on. Gating signals generated by multivibrator 62 may be used to effect this function, if desired.

The local oscillator amplifier 20 must be capable of providing a CW signal of approximately six watts. A traveling wave tube will be used for this purpose.

The elevation exciter 36 is of very similar design to the azimuth exciter 12. The difference between the two lies primarily in that oscillator bank B in the elevation exciter 36 has only five oscillators, since the required number of elevation beam positions is considerably less than in the case of azimuth scan. Also, oscillator bank C is omitted because, as is hereinafter explained, it is only necessary for elevation exciter 36 to generate signals of a frequency that will determine the phase difference between horizontal linear arrays.

Referring to FIG. 4, there is shown a perspective view of the transmitting antenna 16 and the receiving antenna 22. The transmitting antenna 16 is of a design similar to that disclosed in copending application for patent Ser. No. 374,708, entitled, Frequency-Sensitive Rapid-Scanning Antenna, filed Aug. 17, 1953, by Eric Strumwasser and Lester C. Van Atta, now Patent No. 3,039,097, and assigned to the same assignee as is the present case. The transmitter antenna 16 has a primary feed 80, shown schematically and as disclosed in the Strumwasser, Van Atta application, consists of a folded waveguide transmission line with a horizontal array of slot radiators 81. This feed, in turn, illuminates an offset parabolic cylinder reflector 82. The antenna 16 without the reflector 82 has a 1.25 degree azimuth beamwidth and an elevation beamwidth of 15°. Cosecanting of the beam to 45° elevation is obtained by proper shaping of the reflector 82. Also, offset feeding of the reflector 82 is required in this instance because of the small vertical aperture of the antenna, i.e., center feeding would result in excessive blocking of the aperture with consequent high near-in side lobes.

The primary feed 80 is the basic apparatus by which frequency scanning in azimuth is obtained. To provide primary feed 80, a standard S-band waveguide is folded back and forth upon itself and a linear array of slots 81 cut in the feed 80. Because the length of transmission line between elements is long compared to the interelement spacing, the progressive phase shift between the elements can be made to vary by shifting the frequency of the transmitter over a nominal bandwidth. As a result, the beam of the antenna 16 can be made to scan in one plane by shifting the frequency of the transmitter. The azimuth beam position of the antenna is given by $$\Psi = \sin^{-1}\frac{S}{a}\left(\frac{\lambda}{\lambda g} - \frac{\lambda}{\lambda g_o}\right) \quad \text{Equation 1}$$

where $\lambda$ is the free space wavelength, $\lambda g$ the transmission wavelength, $\lambda g_o$ the operating wavelength required for a broadside beam position, S the length of transmission line between elements, and $a$ is the interelement spacing. The characteristics of the feed 80 required for a typical transmitting antenna 16 are given in the following table:

| | |
|---|---|
| Azimuth beamwidth (broadside) | 1.25 degrees. |
| Interelement spacing | 2.0 inches. |
| Length of waveguide between radiators | 51 inches. |
| Number of radiators | 96. |
| Feed aperture | 16 feet. |
| Total path length from first to last element | 410 feet. |
| R.F. transmit time from first to last element | 0.67 microsecond. |
| Power loss in waveguide (approx. ½ normal loss because of slot radiation) | 3 db. |

The feed 80 for the antenna 16 may be constructed in a modular manner with each straight section of the waveguide together with its associated bend being an integral unit. Each of these units or J sections, as they are commonly called, are individually removable to facilitate maintenance. The slot radiators are of the longitudinal non-resonant type so as to provide horizontal polarization. The coupling coefficient of this type of slot is controlled by varying its length. All of the slots will be far from resonance so that no phase correction problem exists.

The reflector 82 is constructed in sections since it must be 16 feet long and a 16 foot single span is not practical to construct. Consequently, the reflector 82 is made up of four sections each approximately 4 feet long and made from aluminum honeycomb paneling to assure minimum weight and reliable control of the contour of the reflector.

The feed 80 of the transmitting antenna 16 extends beyond the plane of the receiving antenna 22 by approximately 2.5 feet thereby to permit the face or aperture of the reflector 82 to be in the same plane as that of the receiving antenna 22. Also, the extension of the sinuous waveguide feed 80 beyond the radiating planes of the two antennas 16, 22 effects the required isolation therebetween. In this manner, of the order of 40 decibels of isolation between the transmitting antenna 16 and the nearest portions of the receiving antenna 22 can be obtained.

The receiving antenna 22 is constituted of a two-dimensional array of elements measuring 18 feet horizontally and 20 feet vertically. Each horizontal row contains of the order of 96 elements and each vertical row contains 120 elements. The size of the antenna 22 enables obtaining beamwidths of approximately 1.0 degree in elevation and 1.25 degrees in azimuth. An aperture of the above size results in antenna gain of approximately 44 decibels at broadside for a broadside frequency of 3000 megacycles per second. Each element of the antenna 22 will consist of short sections of thin waveguide with a longitudinal aperture 84 in the broadside thereof and loaded with dielectric in order to permit a nominal inside dimension of 1.8 inches. The narrow dimension of this waveguide is disposed horizontally whereby the aperture 84 of each element is vertical and consequently may be energized by horizontally polarized radiation. Each waveguide element 84 is coupled through a coaxial transition to a single ended crystal mixer 90 (see FIG. 5A) which mixer 90 is also coupled to a delay line $L_1$ which receives signals from the local oscillator amplifier 20.

In accordance with the present invention, the receiving antenna 22 is capable of scanning a synthesized pencil beam in two planes. The azimuth scan is obtained by shifting the frequency of the local oscillator exciter 12 so that the synthesized receiver beam tracks the transmitter beam. The elevation scan is obtained by shifting the phases of the received signals from each individual horizontal row of elements. By coherently adding the received signals from these horizontal rows of elements, the receiver pencil beam is synthesized. The position of this pencil beam is dependent on the progressive phase shift that is introduced between each individual row of elements when combined in the receiver portion of the system.

Figure 5B:
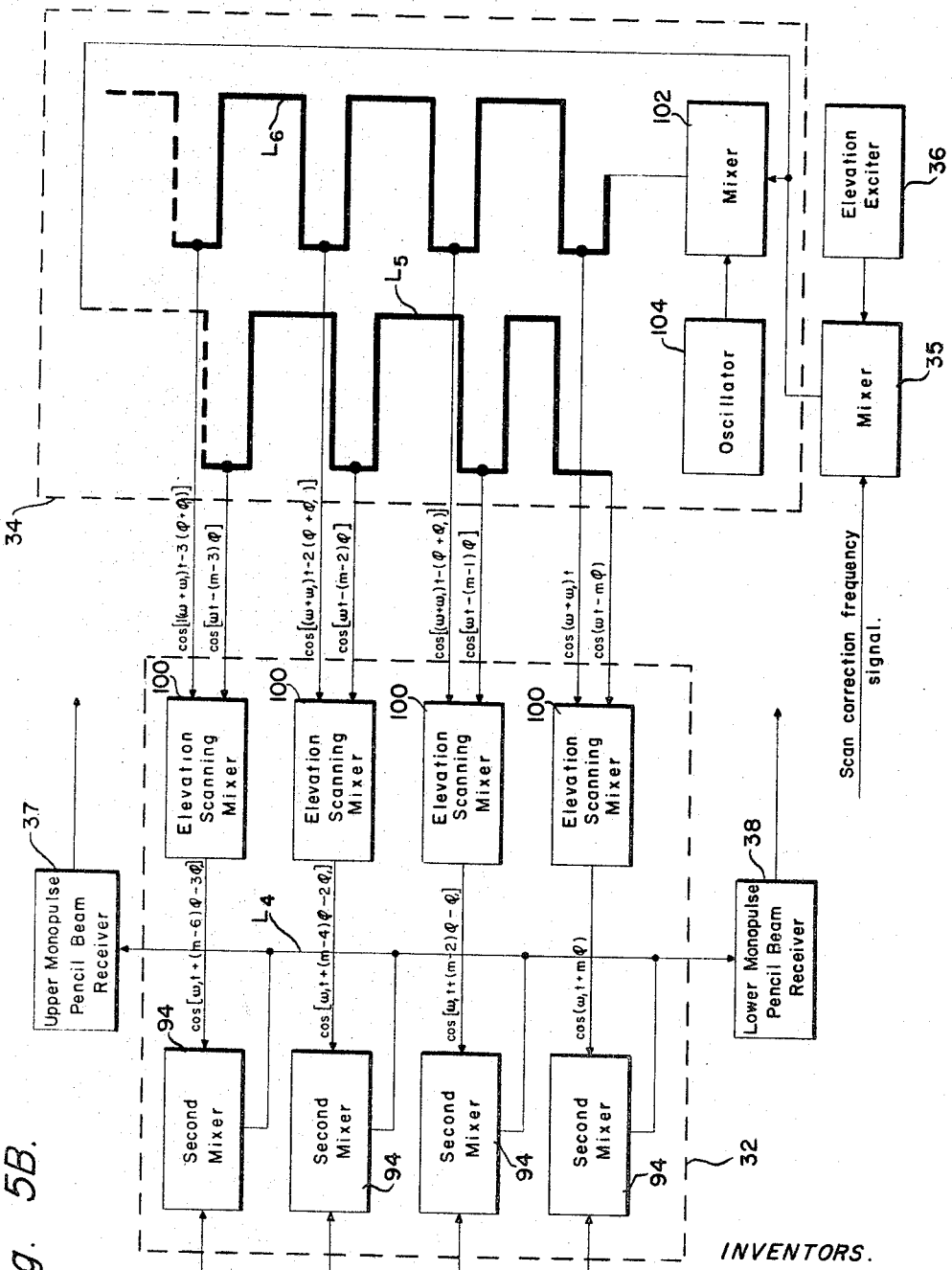

Additional details of the system of FIG. 1 together with the manner in which the receiving antenna 22 and its associated circuitry operate are described in connection with the schematic block diagram of FIGS. 5A and 5B. FIG. 5A illustrates a lower right-hand portion of the receiving antenna 22 as viewed from the back. This portion includes 16 elements 84 (illustrated schematically) of the antenna 22: four of which are disposed vertically and four horizontally. These elements 84 are each coupled to one of the input circuits of its corresponding single ended crystal mixer 90. The receiving antenna 22 also includes a delay line $L_1$, periodic points of which are coupled to the remaining input circuits of the first mixers 90 through lines $L_2$ in the manner hereinafter described. Further, output terminals 91 of first mixers 90 corresponding to adjacent receiving elements 84 are interconnected by delay lines $L_3$ as indicated in the drawing.

In order to obtain azimuth scanning, the local oscillator frequency is shifted and is passed through the delay line $L_1$. This frequency shifting of the local oscillator in the system is required in order that the synthesized receiving antenna beam track with the transmitting antenna beam. In order to scan the receiving antenna beam, a uniform phase difference must be introduced between signals appearing on adjacent horizontal receiving elements 84. This phase difference is obtained by means of the delay line $L_1$. The local oscillator signal is coupled from delay line $L_1$ and fed to the input circuits of vertical rows of the mixers 90 through the lines $L_2$. These lines $L_2$ can be a branching structure feed system, in which case no relative phase shift occurs in the branching lines as the frequency is shifted. As illustrated in the drawing, however, the line length is sensitive to frequency and the phase shift introduced in lines $L_2$ will cause the beam to scan vertically. This effect is subsequently cancelled through the proper combining of the scan correction frequency signal provided by the azimuth exciter 12 with the signal provided by elevation exciter 36.

The outputs of the mixers 90 are summed by horizontal rows by means of the lines $L_3$. The combination of the phase delay introduced by the lines $L_3$ and $L_1$ is such as to produce accurate tracking between the transmitter and the receiver antennas 16, 22. The tracking decorrelation between these two antennas due to the dispersion of waveguide transmission line is less than 0.5 percent of the azimuth beamwidth.

The signals from the horizontal rows of elements 84 are combined in two different manners so that two elevation beamwidths are obtained in separate channels. One vertical beamwidth is 15 degrees and is used in conjunction with the search mode of the radar. The other vertical beamwidth is 1 degree and is used for height finding and tracking. The 1 degree beamwidth channel will be described first.

The signals from $L_3$ are added in small preamplifiers 92 of the I.F. amplifier bank 24 in order to raise the signal level above noise. These signals are then fed into second mixers 94 of the elevation beam forming network 32 (see FIG. 5B) where they are mixed with signals at 42 megacycles/second that introduce the progressive phase shift required to effect a vertical positioning of the beam. The outputs of the second mixers 94 are then summed coherently in a delay line $L_4$. This delay line $L_4$ is terminated at both ends by the upper and lower monopulse pencil beam receivers 37, 38 which receivers employ conventional 12 megacycle I.F. amplifiers. The design of the delay line $L_4$ is such that the beam position received by the lower monopulse pencil beam receiver 38 is displaced from the beam position received by the upper monopulse pencil beam receiver 37 by slightly more than 1 degree. The beams received by the receivers 37, 38 cross over at approximately their 6 db points whereby the output signals therefrom can be used to obtain the elevation monopulse tracking error signal previously described.

The progressive phase shift required for elevation scanning is obtained by feeding the output signal obtained from the elevation exciter 36 corrected by the scan correction frequency signal in mixer 35 into the elevation phase shifting network 34. The elevation phase shifting network 34 contains two delay lines, $L_5$ and $L_6$, which are capable of introducing a uniformly increasing delay between each horizontal row or linear array of elements 84 of the receiving antenna 22. The following explanation will be based on the assumption that the receiving antenna has $m$ horizontal rows of elements. The frequency of the signal applied to the elevation phase shifting network 34 is applied directly to the top of the delay line $L_5$ as viewed in the drawing. On the basis that the frequency characteristic of the signal thus applied to the network 34 may be represented by $\cos \omega t$, the frequency characteristics of the signal available at the last four of $m$ periodicities of the delay line $L_5$ wherein a delay of $\varphi$ radians is introduced within each periodicity thereof are $$\cos [\omega t - (m-3)\varphi],$$
$$\cos [\omega t - (m-2)\varphi],$$
$$\cos [\omega t - (m-1)\varphi] \text{ and } \cos (\omega t - m\varphi)$$

The frequency of the signal applied to the delay line $L_6$, on the other hand, is shifted by the amount equal to the sum of the two intermediate frequencies used in the system, namely, the sum of 12 and 30 megacycles. Thus, the signal $\cos \omega t$ is applied to a mixer 102 together with the output signal from a 42 megacycle oscillator 104 to provide a signal $\cos (\omega + \omega_1)t$ wherein $\omega_1$ in the present case is the angular frequency equivalent to 42 megacycles per second. This signal $\cos (\omega + \omega_1)t$ is applied to the extremity of delay line $L_6$ which corresponds to the bottom portion of the receiving antenna 22. Thus, the frequency characteristic of the signals available at the first four periodicities may be represented as $\cos (\omega + \omega_1)t$, $\cos [(\omega + \omega_1)t - (\varphi + \varphi_1)]$, $\cos [(\omega + \omega_1)t - 2(\varphi + \varphi_1)]$ and $\cos [(\omega + \omega_1)t - 3(\varphi + \varphi_1)]$ wherein $\varphi_1$ is the portion of the delay attributable to the angular frequency $\omega_1$. The above signals appearing at corresponding points along the delay lines $L_5$ and $L_6$ are, in turn, applied to the elevation scanning mixers 100 of the elevation network 32. As seen above, by feeding of the signals into delay lines $L_5$ and $L_6$ from the opposite ends thereof, the progressive phase shift of the two lines can be made to add by taking the difference of the two frequencies appearing at corresponding periodicities thereof in the elevation scanning mixers 100. Thus, the relative phase of the signals appearing at the output terminals of the scanning mixers 100 may be represented as $\cos [\omega_1 t + (m-6)\varphi - 3\varphi_1]$, $\cos [\omega_1 t + (m-4)\varphi - 2\varphi_1]$, $$\cos [\omega_1 t + (m-2)\varphi - \varphi_1] \text{ and } \cos (\omega_1 t + m\varphi)$$

in going from top to bottom, as shown in the drawing. It is noted that the angular frequency $\omega_1$ introduced a delay of $\varphi_1$ radians between each successive signal. In that this phase difference remains constant, it may be compensated for in the programming of radar system. Also, as previously specified, the latter signals are applied to the respective second mixers 94 along with the output signals from the preamplifiers 92, which output signal represents the coherent sum of all the signals received by each of the elements 84 in a horizontal row thereof in the antenna 22.

The electrical length of the delay line $L_2$ is small compared to the electrical lengths of delay lines $L_5$ and $L_6$. As illustrated in the drawing, these lines differ in length from delay line $L_2$ by a factor of approximately 8. Since the phase shift of delay line $L_5$ is added to that of delay line $L_6$, a dispersion ratio of 16:1 exists between delay line $L_2$ and the combination of delay lines $L_5$ and $L_6$. Since the frequencies in these three delay lines are all comparable (S-band), the correction frequency introduced into the output of the elevation exciter 36 must be $\frac{1}{16}$ the frequency output of the azimuth exciter 12. As indicated in connection with the description of FIG. 3, the scan correction signal is obtained from the azimuth exciter 12 at $\frac{1}{16}$ the final output frequency of this exciter. In this manner the elevation scanning produced by phase shift along the delay lines $L_2$ due to changes in the azimuth exciter frequency can be compensated.

The 15 degree elevation beamwidth is obtained by combining the outputs from each group of 8 adjacent horizontal row preamplifiers 92. The outputs from the 8 preamplifiers 92 are fed through individual buffer amplifiers 93 and then combined in the delay line $L_7$. Although the output of 8 horizontal rows of elements 84 results in a 15 degree elevation beamwidth, the full advantage of the array cannot be realized unless the output of all groups of 8 horizontal rows of elements are combined. The receiving antenna 22 is divided into 15 equal horizontal groups, each group containing 8 horizontal arrays of elements 84. As specified above, the outputs from each of these 15 groups are first combined by means of buffer amplifiers 93 and a delay line $L_7$, in the manner described and then fed to fifteen 30 megacycle I.F. amplifiers 108 and video detectors 110. The outputs from the 15 video detectors 110 are combined in a single line 112. The elevation scanning caused by delay line $L_2$ is of negligible consequence with a 15 degree elevation beamwidth. Since the radar return is correlated and the noise in the line 112 is not, a resulting gain is obtained, even though this gain is less than that which could be obtained by coherent addition of the signals. Coherent addition of the signals is, of course, undesirable as it would result in a 1 degree elevation beamwidth.

As is evident from the above, proper operation of the system of the present invention is dependent upon the characteristics of the delay lines. Referring to FIGS. 5A and 5B, there are seven transmission lines which introduce phase shift as a function of frequency in the system. Delay lines $L_1$, $L_3$, $L_4$, $L_5$ and $L_6$ introduce delays intentionally for proper operation of the system. Delay $L_2$ introduces phase shift in order to maintain simplicity of the design, as does delay line $L_7$.

Delay line $L_1$ is required to provide tracking between the transmitting and receiving antennas 16, 22 by shifting the local oscillator frequency in conjunction with any shift in the transmitter frequency. Proper tracking of the two antennas 16, 22 is provided by the delay introduced by both $L_1$ and $L_3$. In order to provide adequate tracking between the transmitter and the receiver, delay line $L_1$ must have the same dispersion characteristics as the delay line or feed 80 in the transmitting antenna 16. For this reason delay line $L_1$ must be constructed from waveguide. The fact that the frequency of the local oscillator signal has a different percent change than that of the transmitter signal means that perfect tracking between the two cannot be achieved. $L_1$ can be designed, however, so that in conjunction with $L_3$ the tracking error can be made completely negligible. $L_1$ is preferably constructed from a waveguide having a narrow "$b$" dimension, since high power handling capacity is required in this portion of the system. The broad dimension of the waveguide must be nonstandard in order to insure proper tracking. Calculations show that with the local oscillator frequency operating below the transmitter frequency, the added compensation required by $L_3$ is 9.37 degrees between adjacent mixers 90. This amount of phase shift is easily obtained in a standard TEM type transmission line. Since the power handling capacity required of lines $L_3$ is small, an appropriate length of coaxial transmission line can be coiled up and can therefore be of a sufficiently small dimension such that inaccessibility to the mixers 90 does not occur due to their presence. The length of the delay line $L_1$ is made approximately equal to the length of the feed 80 of the transmitting antenna 16.

As stated previously, the delay line $L_2$ can be constructed in two different ways. In either of the two cases, construction would be made from simple coaxial transmission line. The proposed technique is simple and has very small depth, thus insuring accessibility to each of the individual mixers 90. The disadvantage of the proposed construction is that the line has an inherent frequency sensitivity. As described previously, this frequency sensitivity can be removed by the addition of the mixer 35 to the system. An alternate construction of delay line $L_2$ requires that it be a branching structure feed. As such there would be several coaxial lines mounted one over the other in order to achieve the branching. This type of structure is more complex to build and has the serious handicap of requiring some depth, thus making accessibility to at least some of the first mixers 90 difficult.

As previously discussed, the delay line $L_4$ must introduce a progressive phase shift in order that the signals adding in one direction of propagation on the line result in a beam position slightly displaced from that produced by the same signals adding in the opposite direction of propagation on the line. Calculations show that the length of line required is approximately equal to the vertical interelement spacing of the antenna 22 whereby a simple coaxial line may be employed for line $L_4$.

Delay lines $L_5$ and $L_6$ are of very similar construction and may be constructed from standard coaxial transmission line. The coupling coefficients in both of these lines are not critical, although some care must be taken to assure that the variation in coupling at different points does not exceed approximately 6 db.

The transmission line $L_7$ introduces a delay which performs no particular function in the operation of receiving system. Again the phase delay obtained in $L_7$ is not significant, since the frequency in this line is constant.

Although specific parameters for an S-band radar system have been described, it will be understood that the circuit specifications of the radar system of the present invention may vary according to the design for any particular application. That is, the above-mentioned circuit parameters were given in order to explain the mode of operation of the disclosed embodiment of radar system and in no way represent a limitation of the scope of the invention or its possibilities of use.

What is claimed is:

1. An electronic scanning radar system including apparatus for producing a synthesized fan-shaped receiving beam, said apparatus comprising a linear array of elements; a mixer corresponding to each one of said elements of said linear array, each of said mixers having first and second input circuits and an output circuit, said first input circuit of each mixer being coupled to its corresponding element; means interconnected between the output circuits of each two mixers which mixers correspond to adjacent pairs of elements of said linear array for introducing a predetermined phase delay in a signal propagated therebetween; delay line means having periodically spaced points therealong, successive ones of which correspond to successive elements of said linear array; means coupling the second input circuit of each of said mixers to said delay line means at the spaced point therealong corresponding thereto; and means for energizing said delay line means at a selected point therealong with electromagnetic energy of a predetermined frequency whereby the signal appearing on the output circuit of the mixer associated with the element which corresponds to said selected point along said delay line means constitutes the output signal from said apparatus.

2. An electronic scanning radar system including apparatus for producing a synthesized fan-shaped receiving beam, said apparatus comprising a linear array of elements; a mixer corresponding to each one of said elements of said linear array, each of said mixers having first and second input circuits and an output circuit, said first input circuit of each mixer being coupled to its corresponding element; a first delay line means interconnected between the output circuits of each two mixers which mixers correspond to adjacent pairs of elements of said linear array; second delay line means having periodically spaced points therealong, succesive ones of which correspond to succesive elements of said linear array; means coupling the second input circuit of each of said mixers to said second delay line means at the spaced point therealong corresponding thereto; and means for energizing said second delay line means at a selected point therealong with electromagnetic energy of a predetermined frequency whereby the signal appearing on the output circuit of the mixer associated with the element which corresponds to said selected point along said second delay line means constitutes the output signal from said apparatus.

3. The electronic scanning radar system including apparatus for producing a synthesized fan-shaped receiving beam as defined in claim 2 wherein said selected point along said second delay line means corresponds to an element disposed at one extremity of said linear array.

4. The electronic scanning radar system including apparatus for producing a synthesized fan-shaped receiving beam as defined in claim 2 including means to shift said predetermined frequency of said electromagnetic energy thereby to change the direction of said synthesized fan-shaped receiving beam.

5. An electronic scanning radar system including apparatus for producing a synthesized fan-shaped receiving beam, said apparatus comprising a linear array of receiving elements; a mixer associated with each one of the receiving elements of said linear array, each of said mixers having first and second input circuits and an output circuit, the first input circuit of each mixer being adapted to receive input signals from its associated receiving element; means for applying a series of signals to the second input circuits of said mixers, said signals being of a single selected frequency and having a progressively increasing phase delay commencing from the mixer associated with one of the receiving elements at the extremity of the linear array and proceeding to the mixers associated with the next successive receiving elements immediately adjacent said one receiving element; and delay line means interconnected between the output circuit of each pair of mixers associated with adjacent receiving elements, whereby the signal appearing on the output circuit of the mixer associated with said one of the receiving elements at said extremity of the linear array constitutes the output circuit from said apparatus.

6. An electronic scanning radar system including apparatus for producing a synthesized receiving beam, said apparatus comprising a plurality of linear arrays of receiving elements, the receiving elements in each individual array having corresponding receiving elements in the remaining linear arrays; a mixer corresponding to each one of the receiving elements of said plurality of linear arrays, each of said mixers having first and second input circuits and an output circuit, said first input circuit of each mixer being adapted to accept signals from its corresponding receiving element; first delay line means having periodically spaced points therealong, successive ones of which correspond to successive receiving elements of one of said plurality of linear arrays; means coupling the second input circuit of each of said mixers to said first delay line means at the spaced point therealong corresponding thereto; second delay line means interconnected between the output circuits of each two mixers which correspond to adjacent pairs of receiving elements of each individual linear array; and means for energizing said first delay line means at one extremity thereof with electromagnetic energy of a predetermined frequency whereby the signals appearing on the output circuits of the mixers associated with the receiving elements which correspond to said one extremity of said first delay line means constitute the output signals from said apparatus.

7. The electronic scanning radar system including apparatus for producing a synthesized receiving beam as defined in claim 6 which apparatus includes additional means for coherently adding the output signals from a selected group of said plurality of linear arrays of receiving elements, said group being composed of successive adjacent linear arrays thereby to produce a synthesized fan receiving beam having an acute angle beamwidth.

8. The electronic scanning radar system including apparatus for producing a synthesized receiving beam as defined in claim 7 which apparatus additionally includes means for noncoherently adding the output from at least two of said groups of said linear arrays of receiving elements thereby to produce an enhanced video signal.

9. An electronic scanning radar system including apparatus for producing a synthesized receiving beam, said apparatus comprising a plurality of linear arrays of receiving elements, the receiving elements in each individual array having corresponding receiving elements in the remaining linear arrays; a first mixer corresponding to each one of the receiving elements of said plurality of linear arrays, each of said first mixers having first and second input circuits and an output circuit, said first input circuit of each first mixer being adapted to accept signals from its corresponding receiving element; first delay line means having periodically spaced points therealong, successive ones of which correspond to successive receiving elements of one of said plurality of linear arrays; means coupling the second input circuit of each of said first mixers to said first delay line means at the spaced point therealong corresponding thereto; second delay line means interconnected between the output circuits of each two first mixers which correspond to adjacent pairs of receiving elements of each individual linear array; means for energizing said first delay line means at one extremity thereof with electromagnetic energy of a predetermined frequency whereby the signals appearing on the output circuits of the first mixers associated with the receiving elements which correspond to said one extremity of said first delay line means constitute the output signals from said apparatus; a second mixer for each one of said linear arrays of receiving elements, each of said second mixers having first and second input circuits and an output circuit, said first input circuit of each of said second mixers being adapted to receive the output signal from its associated linear array of receiving elements; means for producing a corresponding plurality of intermediate frequency signals having a progressively increasing phase delay of predetermined magnitude between successive signals; means coupling each of said signals to the second input circuit of its respective second mixer; and means for coherently adding the output signals appearing on the output circuits of said second mixers thereby to produce a synthesized pencil receiving beam.

10. The electronic scanning radar system including apparatus for producing a synthesized receiving beam as defined in claim 9 wherein said apparatus for producing said series of intermediate frequency signals additionally includes means for controlling the phase difference between each successive signal thereby to control the angle with respect to broadside of said synthesized pencil receiving beam.

11. The electronic scanning radar system including apparatus for producing a synthesized receiving beam as defined in claim 10 wherein said apparatus additionally includes means for shifting said predetermined frequency thereby to simultaneously control the angle with respect to broadside of said synthesized pencil receiving beam in two dimensions.

12. An electronic scannnig radar system including apparatus for producing a synthesized receiving beam, said apparatus comprising a plurality of linear arrays of receving elements, the receiving elements in each individual array having corresponding receiving elements in the remaining linear arrays; a first mixer corresponding to each one of the receiving elements of said plurality of linear arrays, each of said first mixers having first and second input circuits and an output circuit, said first input circuit of each first mixer being adapted to accept signals from its corresponding receiving element; first delay line means having periodically spaced points therealong, successive ones of which correspond to successive receiving elements of one of said plurality of linear arrays; means coupling the second input circuit of each of said first mixers to said first delay line means at the spaced point therealong corresponding thereto; second delay line means interconnected between the output circuits of each two first mixers which correspond to adjacent pairs of receiving elements of each individual linear array; means for energizing said first delay line means at one extremity thereof with electromagnetic energy of a predetermined frequency whereby the signals appearing on the output circuits of the first mixers associated with the receiving elements which correspond to said one extremity of said first delay line means constitute the output signals from said apparatus; a second mixer for each one of said linear arrays of receiving elements, each of said second mixers having first and second input circuits and an output circuit, said first input circuit of each of said second mixers being adapted to receive the output signal from its associated linear array of receiving elements; means for producing a corresponding plurality of intermediate frequency signals having a progressively increasing phase delay of predetermined magnitude between successive signals; means coupling each of said signals to the second input circuit of its respective second mixer; and delay line means interconnected between the output circuits of each pair of second mixers corresponding to adjacent linear arrays of receiving elements thereby to form a composite delay line whereby the signals appearing at the two extremities of said composite delay line constitute two overlapping synthesized pencil receiving beams.

13. The electronic scanning radar system as defined in claim 12 which additionally includes means for controlling the phase difference between said corresponding plurality of intermediate frequency signals thereby to control the angle with respect to broadside of said two overlapping synthesized pencil receiving beams; and means responsive to the relative amplitudes of said two overlapping synthesized pencil receiving beams to produce a control signal indicative of the deviation of tthe means direction of said overlapping pencil receiving beams from a target.

14. An electronic scanning radar system comprising means for transmitting a transmitter beam in a predetermined direction; a plurality of linear arrays of receiving elements, the receiving elements in each individual array having corresponding receiving elements in the remaining linear arrays; a mixer corresponding to each one of the receiving elements of said plurality of linear arrays, each of said mixers having first and second input circuits and an output circuit, said first input circuit of each mixer being adapted to accept signals from its corresponding receiving element; first delay line means having periodically spaced points therealong, successive ones of which correspond to successive receiving elements of one of said plurality of linear arrays; means coupling the second input circuit of each of said mixers to said first delay line means at the spaced point therealong corresponding thereto; second delay line means interconnected between the output circuits of each two mixers which correspond to adjacent pairs of receiving elements of each individual linear array; and means for energizing said first delay line means at one extremity thereof with electromagnetic energy of a predetermined frequency whereby the signals appearing on the output circuits of the mixers associated with the receiving elements which correspond to said one extremity of said first delay line means constitute output signals representative of synthesized receiving beams having a direction the same as said predetermined direction.

References Cited by the Examiner

UNITED STATES PATENTS 2,426,460  8/1947  Lewis _____ 343—100.6
2,430,296  11/1947 Lewis _____ 343—115

FOREIGN PATENTS 119,219  11/1944  Australia.

CHESTER L. JUSTUS, *Primary Examiner.*

NORMAN H. EVANS, FREDERICK M. STRADER,
*Examiners.*

M. A. MORRISON, R. D. BENNETT,
*Assistant Examiners.*